(12) United States Patent
Tanaka et al.

(10) Patent No.: US 12,216,843 B2
(45) Date of Patent: *Feb. 4, 2025

(54) ELECTRONIC PEN

(71) Applicant: Wacom Co., Ltd., Saitama (JP)

(72) Inventors: Kohei Tanaka, Saitama (JP); Takayuki Arai, Saitama (JP); Kenichi Ninomiya, Saitama (JP); Takenori Kaneda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,092

(22) Filed: Nov. 14, 2023

(65) Prior Publication Data

US 2024/0085996 A1    Mar. 14, 2024

Related U.S. Application Data

(63) Continuation of application No. 17/704,989, filed on Mar. 25, 2022, now Pat. No. 11,853,487, which is a
(Continued)

(30) Foreign Application Priority Data

Oct. 29, 2019    (JP) ................................. 2019-196044

(51) Int. Cl.
*G06F 3/0354*    (2013.01)
*G06F 3/038*    (2013.01)
(Continued)

(52) U.S. Cl.
CPC ........ *G06F 3/03545* (2013.01); *G06F 3/0383* (2013.01); *G06F 3/04164* (2019.05);
(Continued)

(58) Field of Classification Search
CPC ............... G06F 3/03545; G06F 3/0383; G06F 3/04164; G06F 3/044; G06F 3/046; G06F 2203/0384
See application file for complete search history.

(56) References Cited

U.S. PATENT DOCUMENTS

| 11,526,218 | B2 | 12/2022 | Kim et al. |
| 2018/0081458 | A1 | 3/2018 | Horie et al. |
| 2022/0197410 | A1 | 6/2022 | Kim et al. |

FOREIGN PATENT DOCUMENTS

| JP | 5762659 B1 | 6/2015 |
| WO | WO 2014061913 A1 | 4/2014 |

OTHER PUBLICATIONS

International Search Report, mailed Sep. 8, 2020, for International Application No. PCT/JP2020/029179, 5 pages.

*Primary Examiner* — Michael Pervan
(74) *Attorney, Agent, or Firm* — Seed IP Law Group LLP

(57) ABSTRACT

An electronic pen includes a circuit board disposed such that an axial direction of a casing is aligned with a longitudinal direction of the circuit board, an electronic circuit on the circuit board, and a battery having a columnar shape disposed on a side of the circuit board opposite to a pen tip side of the circuit board inside a hollow portion of the casing such that positive and negative electrode conductors protruding from an end surface of the battery extend toward the circuit board. The battery is disposed such that a separation space is formed between the end surface and an end portion of the circuit board and such that tip portions of the positive and negative electrode conductors are in contact with the circuit board. The circuit board and the tip portions of the positive and negative electrode conductors are electrically connected to each other by soldered portions.

16 Claims, 8 Drawing Sheets

Related U.S. Application Data continuation of application No. PCT/JP2020/029179, filed on Jul. 30, 2020.

(51) Int. Cl.
*G06F 3/041* (2006.01)
*G06F 3/044* (2006.01)
*G06F 3/046* (2006.01)

(52) U.S. Cl.
CPC .............. *G06F 3/044* (2013.01); *G06F 3/046* (2013.01); *G06F 2203/0384* (2013.01)

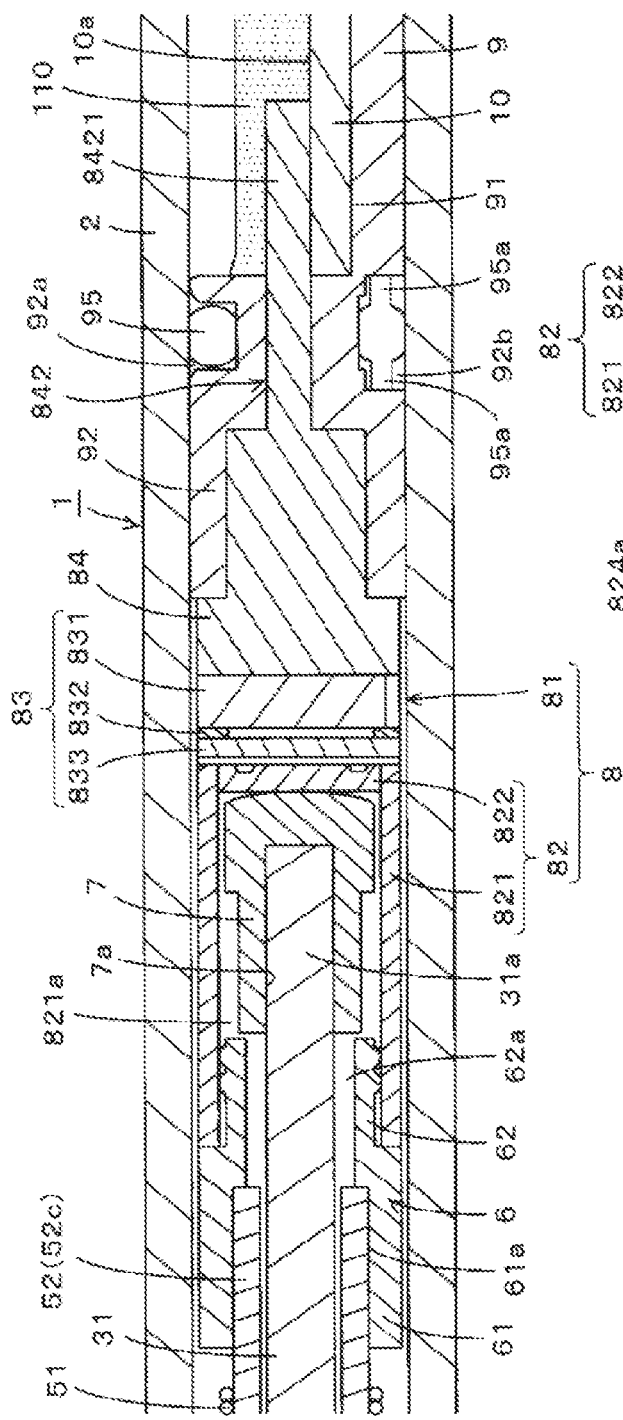
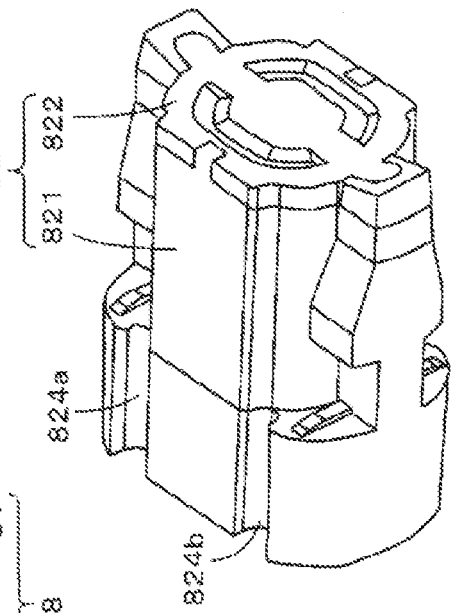
FIG. 4A
FIG. 4B

ELECTRONIC PEN

BACKGROUND

Technical Field

The present disclosure relates to an electronic pen with a built-in battery.

Description of the Related Art

There are various types of electronic pens such as an electromagnetic induction type and a capacitive coupling type. Due to the continued advancement of functions in recent years, more and more electronic pens include various electronic circuits. Therefore, such an electronic pen needs to have a built-in battery that supplies a power supply voltage to the electronic circuits (see, for example, Japanese Patent No. 5762659).

Since an electronic pen of this type consumes higher energy and has a slimmer shape, a battery for such an electronic pen is also required to be small and slim. One example of a battery that is suitable for such an electronic pen is a lithium-ion battery. However, there remain several issues that a small and slim battery such as a lithium-ion battery needs to be handled with care. Moreover, shock resistance and reduction of stress on positive and negative electrode conductors are also required.

BRIEF SUMMARY

It is desirable to provide an electronic pen that can solve the issues described above.

In order to solve the issues described above, an electronic pen is provided including a tubular casing, a circuit board disposed in a hollow portion of the tubular casing such that an axial direction of the casing is aligned with a longitudinal direction of the circuit board, an electronic circuit disposed on the circuit board, and a battery that has a columnar shape and that is disposed on a side of the circuit board opposite to a pen tip side of the circuit board in the axial direction inside the hollow portion of the casing in a state in which positive and negative electrode conductors protruding from an end surface of the battery on one side in a centerline direction of the columnar shape extend toward the circuit board. The battery is disposed in a state in which a separation space is formed between the end surface of the battery from which the positive and negative electrode conductors protrude and an end portion of the circuit board on one side in the longitudinal direction and in which tip portions of the positive and negative electrode conductors are in contact with the circuit board. The circuit board and the tip portions of the positive and negative electrode conductors are electrically connected to each other by soldered portions such that a voltage of the battery is supplied to the electronic circuit as a power supply voltage.

In the electronic pen having the configuration described above, the positive and negative electrode conductors of the battery are disposed in a state in which the positive and negative electrode conductors extend toward the circuit board from the end surface of the battery on one side in the centerline direction of the columnar shape and in which the tip portions thereof are in contact with the circuit board. Further, in a state in which the separation space is formed between the end surface of the battery from which the positive and negative electrode conductors protrude and the end portion of the circuit board on one side in the longitudinal direction, the battery is electrically connected and fixed to the circuit board by the soldered portions.

Therefore, a force from the pen tip side is received not only in the axial direction of the positive and negative electrode conductors of the battery but also in the separation space. With this configuration, the battery can obtain advantageous effects of shock resistance and reduction of stress on the positive and negative electrode conductors.

BRIEF DESCRIPTION OF THE SEVERAL VIEWS OF THE DRAWINGS

FIGS. 4A and 4B are views for describing parts of an internal configuration example of an electronic pen according to an embodiment of the present disclosure;

DETAILED DESCRIPTION

An electronic pen according to an embodiment of the present disclosure will be described below with reference to the drawings. An electronic pen 1 according to the embodiment described below is an electronic pen of an electromagnetic induction type that transmits an indicated position to a position detection device through electromagnetic induction.

Figure 1:
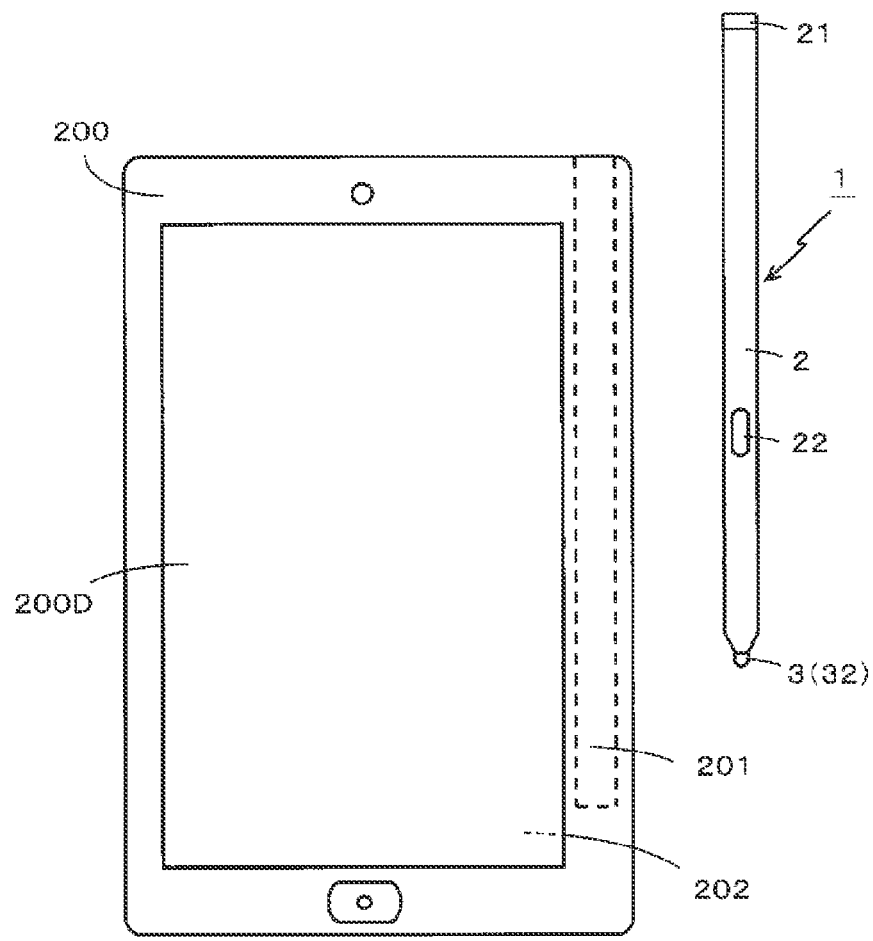
FIG. 1 is a diagram for describing an example of an electronic device that is used with an electronic pen according to an embodiment of the present disclosure.

FIG. 1 illustrates an example of an electronic device 200 which is used with the electronic pen 1 according to the present embodiment. In this example, the electronic device 200 is a high-function mobile phone terminal including a display screen 200D of a display device, such as a liquid crystal display (LCD). The electronic device 200 also includes a position detection device 202 of an electromagnetic induction type in a lower portion (on the back side) of the display screen 200D.

A casing of the electronic device 200 according to this example includes a housing recessed hole 201 in which the electronic pen 1 can be housed. When needed, a user can take out the electronic pen 1 housed in the housing recessed hole 201 from the electronic device 200 and performs a position indication operation on the display screen 200D, which serves as an input surface.

In the electronic device 200, when the user performs the position indication operation with the electronic pen 1 on the display screen 200D, the position detection device 202, which is disposed on the back side of the display screen 200D, detects the position indicated by the electronic pen 1 and the pen pressure of the electronic pen 1, and a microcomputer included in the position detection device 202 of the electronic device 200 performs display processing according to the indicated position and the pen pressure on the display screen 200D.

In the electronic pen 1 according to the present embodiment, a plurality of parts of the electronic pen 1 are aligned in an axial direction and housed in a hollow portion of a tubular case (casing) 2 which is made of, for example, a resin. The tubular case 2 has a tapered shape at one end where an opening (not illustrated in FIG. 1) is formed. Through this opening, a tip portion 32 of a rod-shaped core 3 to be described later is exposed as a pen tip. A rear-end cap 21 is fitted into and closes the other end of the case 2, which is on the side opposite to the pen tip side of the case 2, to ensure waterproof and dustproof sealing.

Figure 2:
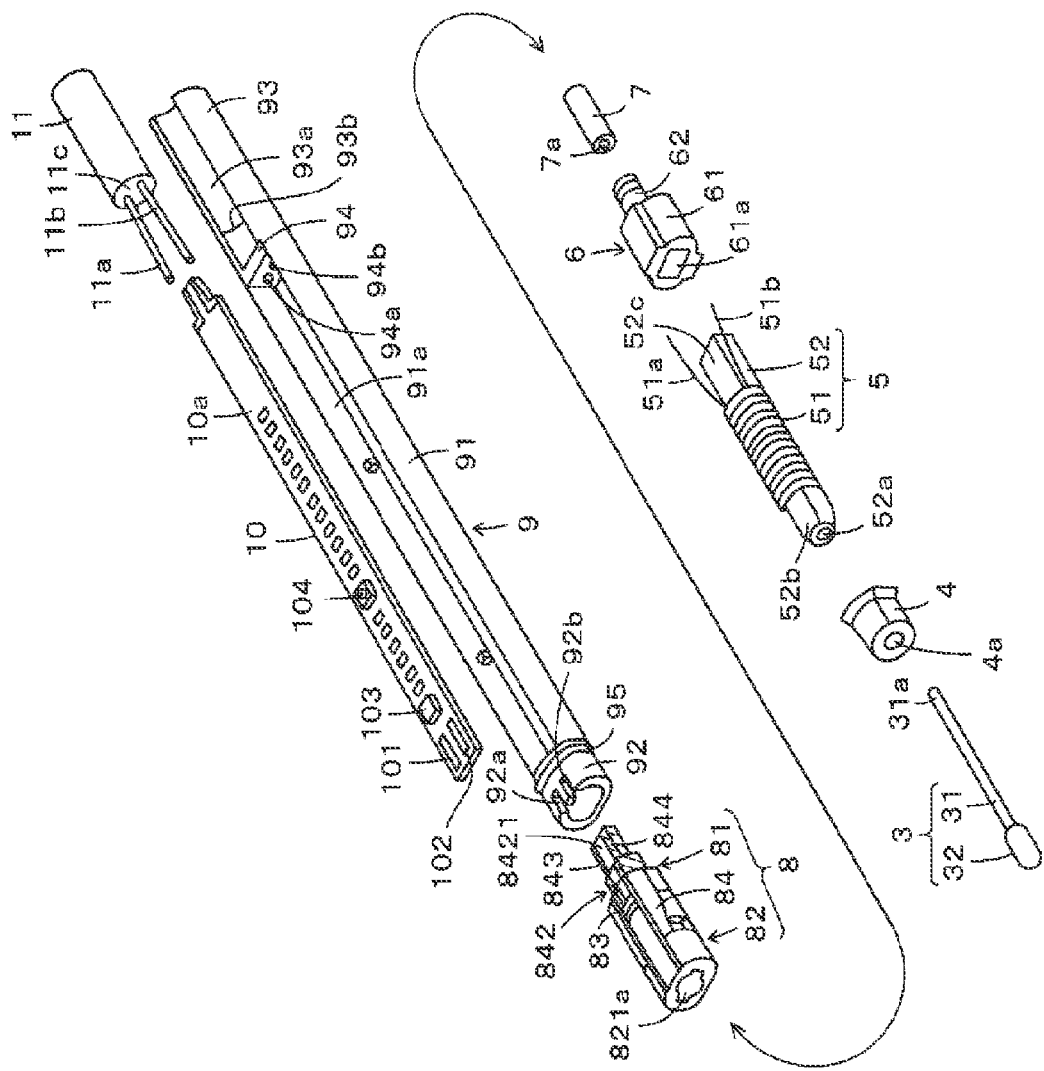
FIG. 2 is an exploded perspective view for describing an internal configuration example of the electronic pen according to an embodiment of the present disclosure.

In this example, the electronic pen 1 includes a side switch. Specifically, as illustrated in FIG. 2, a printed circuit board 10 is disposed in the hollow portion inside the case 2, and a side switch 104 is mounted on the printed circuit board 10. A through-hole (not illustrated) is bored in a side circumferential surface of the case 2 of the electronic pen 1 at a position corresponding to the side switch 104, and as illustrated in FIG. 1, a depression operator 22 for the side switch is exposed through this through-hole such that the side switch 104, which is mounted on the printed circuit board 10, can be depressed. In this case, the electronic device 200 including the position detection device 202 can allocate and set a predetermined function for a depression operation of the side switch 104 through the depression operator 22. For example, the electronic device 200 according to this example can allocate and set an operation similar to a click operation in a pointing device such as a mouse, for the depression operation of the side switch 104 through the depression operator 22.

In this example, as illustrated in FIG. 2, a pen tip side member, the printed circuit board 10, and a battery 11 are aligned in this order in the axial direction and housed in the hollow portion inside the tubular case 2 of the electronic pen 1.

FIG. 2 is an exploded perspective view of parts housed in the case 2 of the electronic pen 1. In FIG. 2, the parts are illustrated separately from each other. Although not illustrated in FIG. 2, in the present embodiment, the external shape in the direction perpendicular to a central axis of the case 2 (which is equal to the contour shape of a cross section of the case 2) is a flat shape. The cross section of the hollow portion inside the case 2 also has a flat shape corresponding to the external shape of the case 2, and the parts housed inside the case 2 also have a shape corresponding to the flat shape of the hollow portion.

As illustrated in FIG. 2, in the hollow portion of the case 2, the core 3, a front cap 4 which constitutes a sealing member, a coil member 5, a coil member holder 6, a pressure member 7, a pen-pressure detection module 8, and a board holder 9 are aligned in this order from the pen tip side in the axial direction of the case 2 (hereinafter simply referred to as the axial direction for the ease of description). The core 3, the front cap 4, the coil member 5, the coil member holder 6, the pressure member 7, and the pen-pressure detection module 8 constitute the pen tip side member.

The board holder 9 is made of an insulating material such as a resin and has a boat-like shape. The board holder 9 includes a board housing portion 91 which is formed in a substantially middle thereof in the axial direction. The board holder 9 also includes a fitting portion 92 and a battery housing portion 93. The fitting portion 92 is located on the pen tip side of the board housing portion 91 in the axial direction and fitted with the pen tip side member. The battery housing portion 93 is located on the side opposite to the pen tip side of the board housing portion 91 in the axial direction.

The board housing portion 91 and the battery housing portion 93 respectively have openings 91a and 93a in the axial direction. The openings 91a and 93a are configured such that the printed circuit board 10 and the battery 11 can be respectively housed and locked therein. In the present embodiment, the board housing portion 91 and the battery housing portion 93 are separated from each other in the axial direction by a wall portion 94.

The printed circuit board 10 is an example of a circuit board. In this example, electronic circuit parts and conductive patterns are formed on both an upper surface 10a of the printed circuit board 10 and a lower surface 10b of the printed circuit board 10 (see FIGS. 8A to 8F).

The fitting portion 92 of the board holder 9 is formed in a tubular shape such that a holder 84 of a pen-pressure detector 81 of the pen-pressure detection module 8, which constitutes part of the pen tip side member, is fitted into the fitting portion 92, as described later.

Next, a configuration example of the pen tip side member will be described. In this example, the core 3 is made of a hard non-conductive material, for example, a resin such as polycarbonate, a synthetic resin, or an acrylonitrile-butadiene-styrene (ABS) resin, and includes a core main body 31 and the tip portion 32 which serves as the pen tip. In the state in which all of the parts described above are housed in the hollow portion of the case 2, the core main body 31 of the core 3 is inserted from the opening on the pen tip side of the case 2 and engaged with the pressure member 7, which is disposed in the pen-pressure detection module 8, as described later. In this case, the core 3 can be inserted into and removed from the electronic pen 1. The core 3 transmits the pressure (pen pressure) applied to the tip portion 32 to a pressure sensing portion 83 of the pen-pressure detector 81.

The coil member 5 includes a coil 51 and a magnetic core, in this example, a ferrite core 52, around which the coil 51 is wound. In this example, the ferrite core 52 of the coil member 5 has a columnar shape having a through-hole 52a at the central axis position. The core main body 31 of the rod-shaped core 3 is inserted through the through-hole 52a. In the present embodiment, the ferrite core 52 has a flat cross-sectional shape corresponding to the cross-sectional shape of the hollow portion of the case 2 and includes a tapered portion 52b which is tapered toward the pen tip.

The front cap 4 is disposed on the tapered portion 52b side of the ferrite core 52, which is on the pen tip side of the electronic pen. The front cap 4 is made of an elastic material such as an elastic rubber and has a cap shape so as to cover the pen tip side of the ferrite core 52. The front cap 4 has an opening (through-hole) 4a through which the core main body 31 of the core 3 is inserted. In this example, as illustrated in FIG. 2, the external appearance of the front cap 4 has a flared skirt shape.

The coil member holder 6 is positioned on an end portion 52c on a side opposite to the tapered portion 52b side of the ferrite core 52. The coil member holder 6 is made of an elastic material such as an elastic rubber. The coil member holder 6 includes a fitting portion 61 into which the end portion 52c of the ferrite core 52 is fitted and housed. The coil member holder 6 also includes a protruding portion 62 which is press-fitted into a hollow portion 821a of a pen-pressure transmission member 82, to be described later, of the pen-pressure detection module 8.

The fitting portion 61 of the coil member holder 6 has a recessed hole 61a which corresponds to the external shape of the end portion 52c around which no coil is wound. A through-hole 62a (not illustrated) through which the core main body 31 of the core 3 is inserted is formed in the protruding portion 62. The through-hole 62a of the protruding portion 62 communicates with the recessed hole 61a of the fitting portion 61. Therefore, in the coil member holder 6, a hollow space through which the core main body 31 of the core 3 is inserted is formed through the fitting portion 61 and the protruding portion 62.

The through-hole 52a through which the core main body 31 of the core 3 is inserted is formed in the ferrite core 52. Therefore, in the state in which the end portion 52c of the ferrite core 52 of the coil member 5 is fitted into the fitting portion 61 of the coil member holder 6, a hollow space through which the core main body 31 of the core 3 is inserted is formed through the coil member 5 and the coil member holder 6.

The pressure member 7, which is disposed on the protruding portion 62 side of the coil member holder 6, includes a fitting recessed hole 7a into which an end portion 31a of the core main body 31 of the core 3 is press-fitted. The presence of the pressure member 7 prevents the core 3 from falling off. However, if the core 3 is strongly pulled toward the tip portion 32, the fitting between the end portion 31a of the core main body 31 and the fitting recessed hole 7a of the pressure member 7 is released, and the core 3 can be pulled out. This allows the core 3 to be replaceable.

Figure 3:
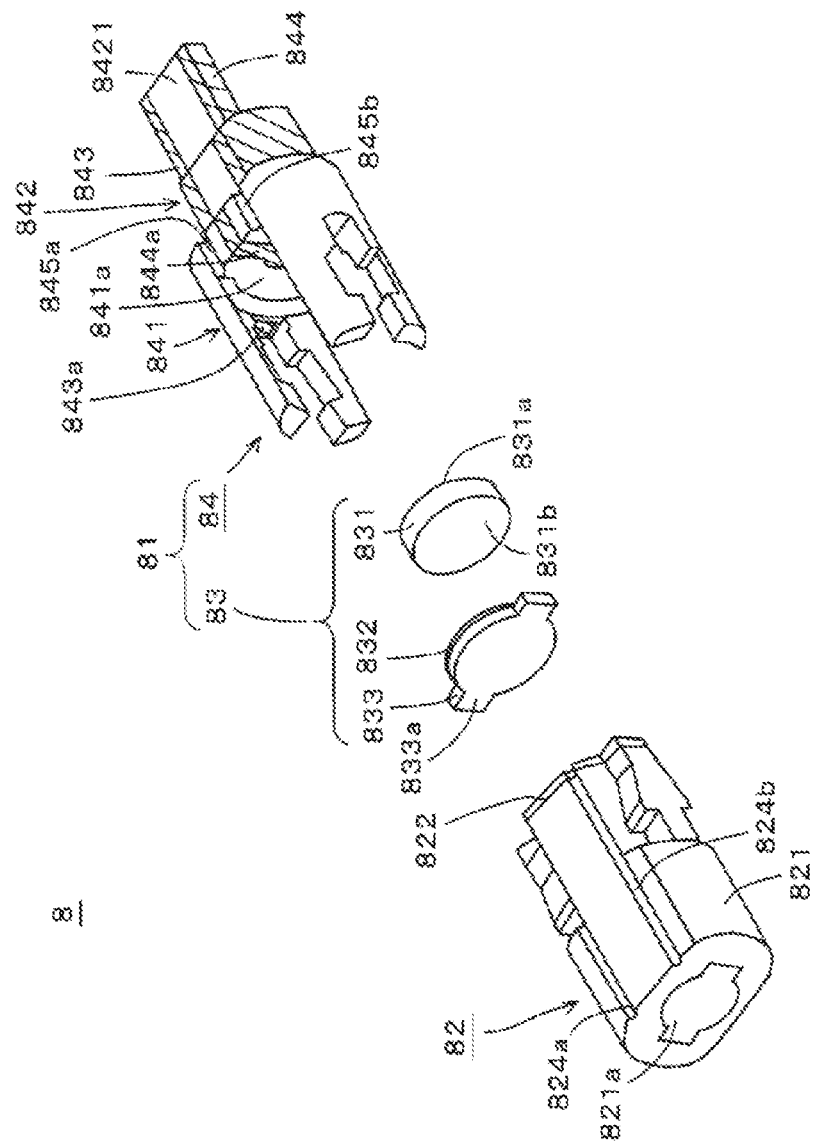
FIG. 3 is an exploded perspective view for describing a configuration example of a pen-pressure detection module of the electronic pen according to an embodiment of the present disclosure.

In the present embodiment, engaging and coupling the pen-pressure detector 81 and the pen-pressure transmission member 82 forms the pen-pressure detection module 8. FIG. 3 is an exploded perspective view of the pen-pressure detection module 8. A configuration example of the pen-pressure detection module 8 will be described in more detail with reference to FIG. 3. FIG. 4A is a sectional view of the vicinity of the pen-pressure detection module 8 which is housed in the case 2. FIG. 4B is an external perspective view of the pen-pressure transmission member 82 when viewed from the side where the pen-pressure transmission member 82 is coupled to the pen-pressure detector 81.

The pen-pressure detector 81 according to this example is a pen-pressure detector using a variable-capacitance capacitor whose capacitance changes according to the pen pressure applied to the core 3. As illustrated in FIGS. 3 and 4A, in the present embodiment, the pen-pressure detector 81 includes the pressure sensing portion 83 and the holder 84. The pressure sensing portion 83 includes a dielectric 831, a spacer 832, and a conductive elastic body 833. The holder 84 holds the pressure sensing portion 83 and also has a function of making an electrical connection. The holder 84 is made of an insulating material such as a resin. As illustrated in FIG. 3, the holder 84 integrally includes a holding portion 841 and a connection portion 842. The holding portion 841 holds the pressure sensing portion 83. The connection portion 842 electrically connects two electrodes of the pressure sensing portion 83 which is held in the holding portion 841, to the printed circuit board 10 which is housed in the board holder 9.

The pen-pressure transmission member 82 is engaged with the holding portion 841 of the holder 84 of the pen-pressure detector 81 such that the pressure sensing portion 83 is held by the holding portion 841 of the holder 84. Further, as described above, the pen-pressure transmission member 82 has the hollow portion 821a into which the protruding portion 62 of the coil member holder 6 is press-fitted. By press-fitting the protruding portion 62 of the coil member holder 6 into the hollow portion 821a of the pen-pressure transmission member 82 which is engaged with and coupled to the pen-pressure detector 81, the pen-pressure detection module 8 and the coil member 5 are coupled to each other.

The pressure sensing portion 83 of the pen-pressure detector 81, which serves as the variable-capacitance capacitor, includes the dielectric 831, the spacer 832 which has a ring shape, and the conductive elastic body 833. A conductor layer is formed on a first surface 831a of the dielectric 831, constituting a first electrode of the variable-capacitance capacitor. The pen pressure from the core 3 is applied to the conductive elastic body 833 via the pressure member 7 and further via the pen-pressure transmission member 82. Accordingly, the conductive elastic body 833 is pushed and deformed toward a second surface 831b of the dielectric 831 via the ring-shaped spacer 832. This deformation brings the conductive elastic body 833 into contact with the second surface 831b of the dielectric 831. The area of the contact between the conductive elastic body 833 and the second surface 831b of the dielectric 831 constitutes a second electrode.

Therefore, the area of the contact between the conductive elastic body 833 and the second surface 831b of the dielectric 831, that is, the area of the second electrode of the variable-capacitance capacitor which is constituted by the dielectric 831 sandwiched between the first electrode and the second electrode, changes according to the magnitude of the pen pressure applied to the core 3. Accordingly, the capacitance of this variable-capacitance capacitor changes. By detecting the change in the capacitance of the variable-capacitance capacitor, the pen-pressure detector 81 detects the pen pressure.

The holder 84 of the pen-pressure detector 81 is, for example, an injection molded product produced by using a resin, and integrally includes the holding portion 841 and the connection portion 842. The connection portion 842 includes a plate-shaped protruding portion 8421 which protrudes in the axial direction and in the direction parallel to the upper surface 10a of the printed circuit board 10. The protruding portion 8421 is disposed so as to come into contact with the upper surface 10a of the printed circuit board 10 when the pen-pressure detection module 8 is fitted into the board holder 9 and engaged with the printed circuit board 10.

In the present embodiment, two terminal members 843 and 844 (indicated by diagonal lines in FIGS. 2 and 3 to facilitate understanding) are formed in the axial direction on the holder 84 as conductive three-dimensional fine patterns from the holding portion 841 to the connection portion 842. As illustrated in FIGS. 2 and 3, the two terminal members 843 and 844 are formed in the protruding portion 8421 so as to be exposed at opposite edges in the direction perpendicular to the direction in which the pen pressure is applied.

In the present embodiment, when the pressure sensing portion 83 is housed and held in the holding portion 841 of the holder 84 of the pen-pressure detector 81, the first and second electrodes of the pressure sensing portion 83 are automatically electrically connected to the two terminal members 843 and 844 of the connection portion 842.

As indicated by diagonal lines in FIG. 3, one end portion 844a of the terminal member 844 is formed and exposed in a bottom portion of a recess 841a of the holding portion 841 of the holder 84 so as to be in contact with and be electrically connected to the first electrode of the pressure sensing portion 83 (the first surface 831a of the dielectric 831). Similarly, as indicated by diagonal lines in FIG. 3, one end portion 843a of the terminal member 843 is formed and exposed in the holding portion 841 of the holder 84, and a protruding portion 833a of the conductive elastic body 833 which serves as the second electrode of the pressure sensing portion 83 abuts against the one end portion 843a of the terminal member 843 so as to be in contact with and be electrically connected to the one end portion 843a.

In the present embodiment, the two terminal members 843 and 844 of the connection portion 842 of the holder 84 of the pen-pressure detector 81 are electrically connected to the conductive patterns formed on the printed circuit board 10 which is housed in the board holder 9.

As illustrated in FIGS. 3 and 4B, integrally forming a tubular body portion 821 and a barrier 822 forms the pen-pressure transmission member 82 of the pen-pressure detection module 8. The tubular body portion 821 includes the hollow portion 821a inside. The barrier 822 closes the hollow space of the hollow portion 821a of the tubular body portion 821.

In this example, the barrier 822 is formed of a thin plate-like body made of an elastic member such as an elastomer and is configured so as to be elastically displaceable in the direction of the plate thickness thereof. The tubular body portion 821 may be formed of a non-elastic material such as a resin.

The hollow portion 821a of the tubular body portion 821 has an opening on the side where the barrier 822 is not disposed. From this opening, the protruding portion 62 of the coil member holder 6 is press-fitted into the hollow portion 821a.

When the core main body 31 of the core 3 is inserted through and pushed into the through-hole 52a of the ferrite core 52 of the coil member 5, the recessed hole 61a of the fitting portion 61 of the coil member holder 6, and the through-hole 62a of the protruding portion 62 of the coil member holder 6, the end portion 31a of the core main body 31 of the core 3 is press-fitted into the fitting recessed hole 7a of the pressure member 7 of the hollow portion 821a of the pen-pressure transmission member 82, as illustrated in FIG. 4A.

Accordingly, when pen pressure is applied to the core 3, the pen pressure is transmitted to the pressure member 7, and the pressure member 7 presses the barrier 822 of the pen-pressure transmission member 82. Accordingly, the barrier 822 is elastically displaced in the axial direction according to the applied pen pressure.

Figure 5:
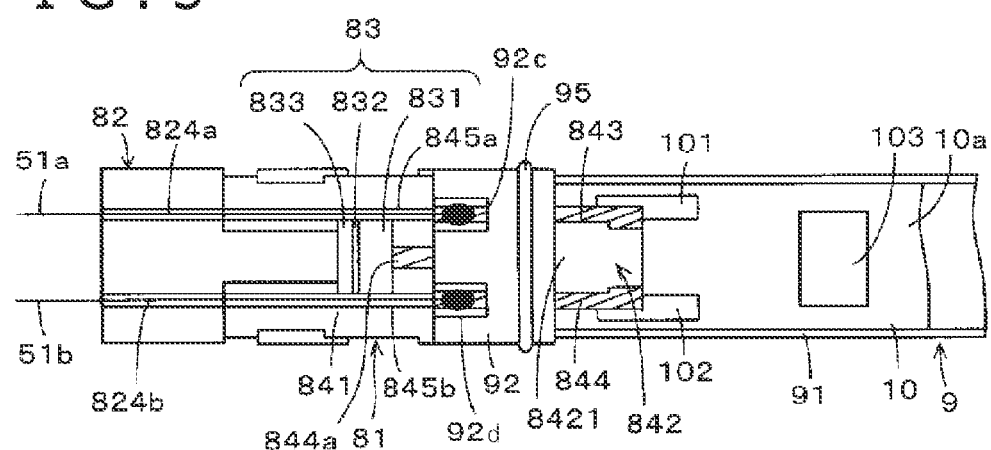
FIG. 5 is a view for describing parts of an internal configuration example of an electronic pen according to an embodiment of the present disclosure.

In the state in which the pressure sensing portion 83 is housed in the holding portion 841 of the holder 84, the pen-pressure transmission member 82 is coupled to the holder 84 in the axial direction. Since the pen-pressure transmission member 82 and the holder 84 are coupled to each other as illustrated in FIG. 5, the pressure sensing portion 83 is held by the holding portion 841 of the holder 84.

In the state in which the pen-pressure transmission member 82 is engaged with and coupled to the holder 84, the barrier 822 of the pen-pressure transmission member 82 can press the conductive elastic body 833 of the pressure sensing portion 83, as illustrated in FIG. 4A.

As described above, when pen pressure is applied to the core 3, the pressure member 7 presses the barrier 822 of the pen-pressure transmission member 82 according to the applied pen pressure, and the barrier 822 is elastically deviated in the axial direction according to the applied pen pressure. This elastic displacement of the barrier 822 presses the conductive elastic body 833 of the pressure sensing portion 83. As a result, the conductive elastic body 833 which is separated from the dielectric 831 via the spacer 832 comes into contact with the dielectric 831, and the area of the contact therebetween changes according to the pen pressure. The capacitance corresponding to the area of the contact between the conductive elastic body 833 and the dielectric 831 is obtained between the first and second electrodes of the pressure sensing portion 83. In other words, the pen pressure can be detected from the capacitance of the variable-capacitance capacitor as the pressure sensing portion 83.

In such a manner as described above, the coil member 5 is fitted into and coupled to the pen-pressure detection module 8 via the coil member holder 6, constituting the pen tip side member. Then, the connection portion 842 of the holder 84 of the pen-pressure detector 81 of the pen-pressure detection module 8 of the pen tip side member is coupled to the printed circuit board 10 via the fitting portion 92 of the board holder 9.

In the present embodiment, as illustrated in FIG. 2, the fitting portion 92 of the board holder 9 has a tubular shape having a hollow portion into which the connection portion 842 of the holder 84 of the pen-pressure detector 81 of the pen-pressure detection module 8 is inserted. As illustrated in FIG. 2, conductive patterns 101 and 102 are aligned and formed on the printed circuit board 10 so as to be respectively electrically connected to the terminal members 843 and 844 of the connection portion 842 of the holder 84 of the pen-pressure detector 81. Each of the two terminal members 843 and 844 is connected to the corresponding one of the two electrodes of the pressure sensing portion 83.

In the present embodiment, when the connection portion 842 of the holder 84 of the pen-pressure detection module 8 is inserted into the fitting portion 92 of the board holder 9, the connection portion 842 is engaged so as to come into contact with the upper surface 10a of the printed circuit board 10 which is housed in the board housing portion 91 of the board holder 9. Accordingly, through the two terminal members 843 and 844 of the connection portion 842, the two electrodes of the pressure sensing portion 83 which is held in the pen-pressure detector 81 are electrically connected to the conductive patterns 101 and 102 which are formed on the upper surface 10a of the printed circuit board 10. Each of the conductive patterns 101 and 102 is connected to a corresponding one of opposite ends of a capacitor 103 which is disposed on the upper surface 10a of the printed circuit board 10 and which constitutes a resonant circuit together with the coil 51.

In the present embodiment, as illustrated in FIGS. 2 and 5, notches 92c and 92d are formed in the fitting portion 92 of the board holder 9 such that the connection portions (soldered portions) between first and second end portions 51a and 51b of the coil 51 and the terminal members 843 and 844 do not obstruct the fitting of the fitting portion 92 of the board holder 9 with the pen-pressure detection module 8.

In the present embodiment, as illustrated in FIGS. 3, 4B, and 5, the pen-pressure transmission member 82 of the pen-pressure detection module 8 includes recessed grooves 824a and 824b which are formed in the axial direction. Further, a circumferential side surface of the holder 84 of the pen-pressure detector 81 also includes recessed grooves 845a and 845b which are formed in the axial direction so as to be respectively continuous with the recessed grooves 824a and 824b of the pen-pressure transmission member 82.

The first end portion 51a and the second end portion 51b of the coil 51 of the coil member 5 pass through the recessed grooves 824a and 824b and the recessed grooves 845a and 845b and are soldered and connected to the terminal member 843 and the terminal member 844 of the connection portion 842 of the holder 84 of the pen-pressure detector 81, respectively.

The terminal member 843 and the terminal member 844 are connected to the capacitor 103 of the printed circuit board 10. Therefore, respectively electrically connecting the first end portion 51a and the second end portion 51b of the coil 51 to the terminal member 843 and the terminal member 844 in this way forms the resonant circuit constituted by the coil 51 and the capacitor 103. Further, the variable-capacitance capacitor constituted by the pressure sensing portion 83 is connected in parallel to the resonant circuit. This configuration eliminates the need to extend the first end portion 51a and the second end portion 51b of the coil 51 to the printed circuit board 10 and solder them on the upper surface 10a of the printed circuit board 10.

Figure 6:
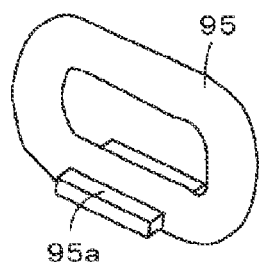
FIG. 6 is a view for describing parts of an internal configuration example of an electronic pen according to an embodiment of the present disclosure.

In the present embodiment, as illustrated in FIGS. 2 and 4A, the fitting portion 92 of the board holder 9 is provided with a sealing member 95 which closes the gap between the board holder 9 and an inner wall portion of the hollow portion of the case 2 when the fitting portion 92 of the board holder 9 is housed in the case 2. FIG. 6 illustrates the external appearance of the sealing member 95, which is formed of a ring-shaped member made of an elastic body such as a rubber. As illustrated in FIG. 4A, a ring-shaped recessed groove 92a is formed in a circumferential side portion of the fitting portion 92 of the board holder 9, and the sealing member 95 is fixedly housed in the ring-shaped recessed groove 92a. In the present embodiment, protrusions 95a are formed on the sealing member 95 to prevent the sealing member 95 from rotating in the circumferential direction of the fitting portion 92. In addition, notches 92b (see FIG. 4A) are formed in part of the ring-shaped recessed groove 92a of the fitting portion 92 to house the protrusions 95a of the sealing member 95.

The sealing member 95 separates a space where the printed circuit board 10 is disposed in the hollow portion of the case 2, from a space on an opening 2a side (see FIG. 7) in which the pen-pressure detection module 8 is present and from which the core 3 protrudes.

Figure 7:
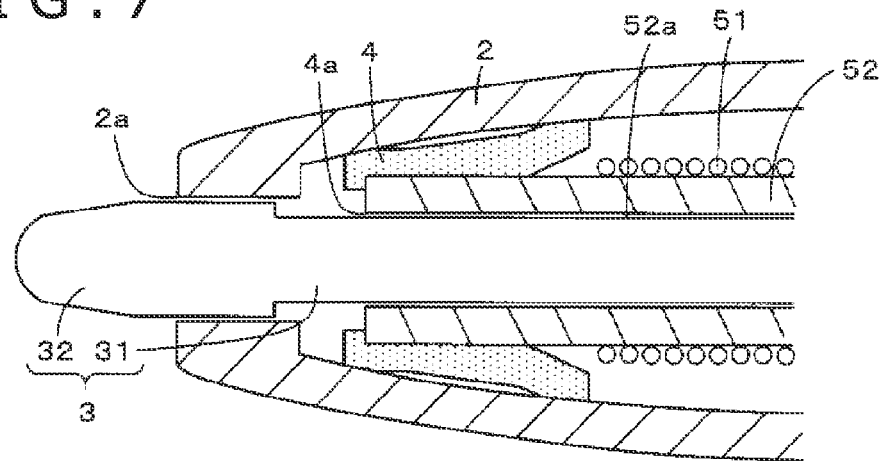
FIG. 7 is a view for describing parts of an internal configuration example of an electronic pen according to an embodiment of the present disclosure.

In the present embodiment, as illustrated in FIG. 7, the front cap 4, which is made of an elastic rubber, is disposed in the vicinity of the opening 2a on the pen tip side of the hollow portion of the case 2 so as to cover the tapered portion 52b of the ferrite core 52, as described above. In this case, when the rear-end cap 21 is fitted to the case 2, the front cap 4 is pressed toward the opening 2a of the case 2. Therefore, the front cap 4 serves as a sealing member that seals and eliminates the gap between a tip portion of the ferrite core 52 of the coil member 5 and an inner wall surface of the hollow portion of the case 2. In this example, the front cap 4 has a flared skirt shape, as described above. Therefore, as illustrated in FIG. 7, the front cap 4 and the inner wall surface of the case 2 are in close contact with each other at two positions. This configuration enhances dustproof and waterproof effects by the sealing.

The sealing by the front cap 4 on the opening 2a side of the case 2 separates a space continuous with the through-hole 52a of the ferrite core 52, from a space of the hollow portion inside the case 2 where pen module parts are housed. The space continuous with the through-hole 52a of the ferrite core 52 includes the recessed hole 61a and the through-hole 62a of the coil member holder 6 and the hollow portion 821a of the pen-pressure transmission member 82 and is closed by the barrier 822 of the pen-pressure transmission member 82.

In the portion in which the protruding portion 62 of the coil member holder 6 is fitted into the pen-pressure transmission member 82, the coil member holder 6 and the inner wall portion of the hollow portion 821a of the pen-pressure transmission member 82 are in close contact with each other without a gap therebetween, thereby ensuring the sealing. Therefore, the space continuous with the through-hole 52a of the ferrite core 52 is an independent space that is isolated from the others, except for the opening side of the through-hole 52a of the ferrite core 52. In the electronic pen 1 of the electromagnetic induction type according to the present embodiment, as illustrated in FIG. 4A, only the core 3 and the pressure member 7 are present in this space, and neither electrical parts nor electrical connection portions are present therein.

Next, an example of a configuration on the side opposite to the pen tip side of the board holder 9, in particular, a configuration example of an electrical connection portion between the printed circuit board 10 and the battery 11, will be described with reference to FIG. 2 and FIGS. 8A to 8F. FIGS. 8A to 8F are views for describing steps for coupling the battery 11 and the printed circuit board 10 to each other.

In the present embodiment, the battery 11 is a lithium-ion battery and is rechargeable. The battery 11 may be recharged by employing any of various methods such as a method using electromagnetic induction and a method using electric field coupling.

The battery 11 according to this example has a columnar shape, in this example, a cylindrical shape. As illustrated in FIG. 2 and FIGS. 8A to 8F, the battery 11 is housed in the battery housing portion 93 of the board holder 9 such that positive and negative electrode conductors 11a and 11b led out from an end surface 11c which is located on one end side in the centerline direction of the columnar-shaped battery 11 extend toward the printed circuit board 10.

In this case, the positive and negative electrode conductors 11a and 11b are led out from the end surface 11c of the battery 11 such that their centerlines are included in a plane that includes the centerline position of the columnar shape of the battery 11 or in a plane parallel to this plane.

However, in the present embodiment, as illustrated in FIG. 2 and FIGS. 8A, 8C, and 8E, the positive and negative electrode conductors 11a and 11b do not extend in the direction perpendicular to the end surface 11c of the battery 11, but extend in such a way that the distance between the positive and negative electrode conductors 11a and 11b gradually increases as they are away from the end surface 11c. In other words, the positive and negative electrode conductors 11a and 12b of the battery 11 extend so as to be oriented in opposite directions from each other by a predetermined acute angle relative to the centerline direction of the columnar-shaped battery 11, that is, the axial direction of the electronic pen 1.

As illustrated in FIG. 2 and FIGS. 8A to 8F, the wall portion 94, which is disposed between the board housing portion 91 and the battery housing portion 93 of the board holder 9, includes through-holes 94a and 94b as examples of penetration portions through which the paired electrode conductors 11a and 11b of the battery 11 penetrate the wall portion 94 and protrude toward the board housing portion 91. In this example, the through-holes 94a and 94b are formed at the positions of the wall portion 94 identical to the board surface position of the printed circuit board 10 which is housed in the board housing portion 91.

Figure 8A:
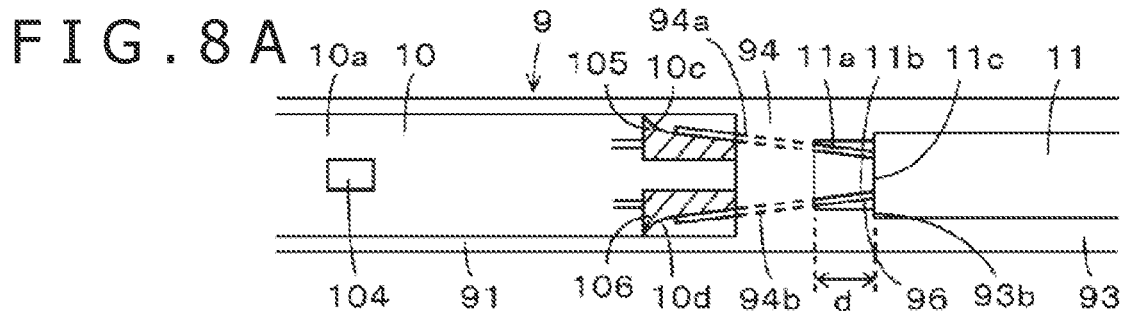
FIGS. 8A to 8F are views illustrating an example of a configuration on a side opposite to a pen tip side of an electronic pen according to an embodiment of the present disclosure.

As illustrated in FIG. 2 and FIGS. 8A, 8C, and 8E, tapered side surfaces 10c and 10d are formed in an end portion of the printed circuit board 10 on the battery 11 side in the longitudinal direction of the printed circuit board 10 and are shaped such that their widths gradually decrease so as to correspond to the extension directions of the positive and negative electrode conductors 11a and 11b of the battery 11. As illustrated in FIG. 8A, in the end portion of the upper surface 10a of the printed circuit board 10 on the battery 11 side in the longitudinal direction, a conductor pattern 105 is formed along the tapered side surface 10c, serving as one power supply terminal, while a conductor pattern 106 is formed along the tapered side surface 10d, serving as the other power supply terminal.

In the present embodiment, with the configuration described above, as illustrated in FIG. 2 and FIGS. 8A to 8F, the positive and negative electrode conductors 11a and 11b of the battery 11 are respectively inserted through the through-holes 94a and 94b of the wall portion 94 so as to extend toward the board housing portion 91. In this case, as illustrated in FIGS. 8A to 8F, the positive and negative electrode conductors 11a and 11b respectively come into contact with the tapered side surfaces 10c and 10d, which are located between the upper surface 10a and the lower surface 10b in the end portion of the printed circuit board 10 on the battery 11 side in the longitudinal direction of the printed circuit board 10.

In this case, the battery 11 is not housed in the battery housing portion 93 of the board holder 9 such that its end surface 11c abuts against the wall portion 94, but is housed in the battery housing portion 93 of the board holder 9 such that its end surface 11c is separated from the wall portion 94 by a predetermined distance d, as illustrated in FIG. 8A. For this purpose, the battery housing portion 93 of the board holder 9 includes a step 93b against which the end surface 11c of the battery 11 abuts. Therefore, a separation space 96 having the distance d in the axial direction is formed between the wall portion 94 and the end surface 11c of the battery 11.

Next, the steps for coupling the battery 11 and the printed circuit board 10 to each other will be described with reference to FIGS. 8A to 8F.

First, as illustrated in FIG. 8A, with the printed circuit board 10 housed in the board housing portion 91, the battery 11 is housed in the battery housing portion 93 by respectively inserting its positive and negative electrode conductors 11a and 11b through the through-holes 94a and 94b of the wall portion 94. Then, as described above, the battery 11 is housed in the battery housing portion 93 such that the separation space 96 is formed between the battery 11 and the wall portion 94. The tip portions of the positive and negative electrode conductors 11a and 11b come into contact with the tapered side surfaces 10c and 10d of the printed circuit board 10, respectively.

Figure 8B:
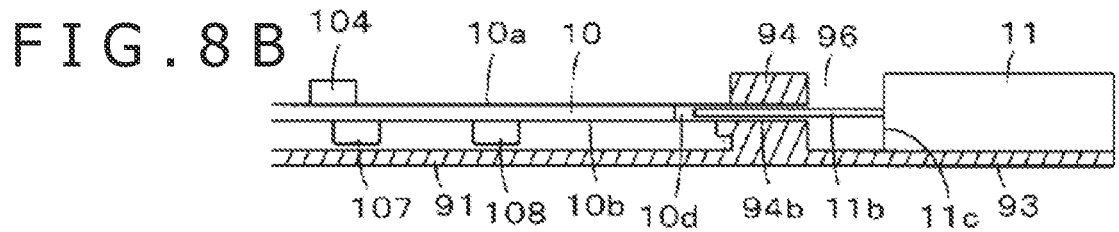

FIG. 8B is a side view illustrating the state of FIG. 8A viewed from the side surface direction parallel to the upper surface 10a of the printed circuit board 10. For convenience of description, the board holder 9 is omitted in FIG. 8B. As illustrated in FIG. 8B, in the present embodiment, electronic parts are mounted not only on the upper surface 10a of the printed circuit board 10 but also on the lower surface 10b thereof. For example, a control circuit 107 including an integrated circuit (IC) and a wireless communication unit 108 for performing short-range wireless communication in accordance with the Bluetooth (registered trademark) standard are mounted on the lower surface 10b. According to the control by the control circuit 107, the wireless communication unit 108 transmits, for example, pen-pressure information detected by the pen-pressure detector 81 and identification information of the electronic pen 1 through wireless communication with the position detection device 202, and also receives an indication signal from the position detection device 202.

Figure 8C:
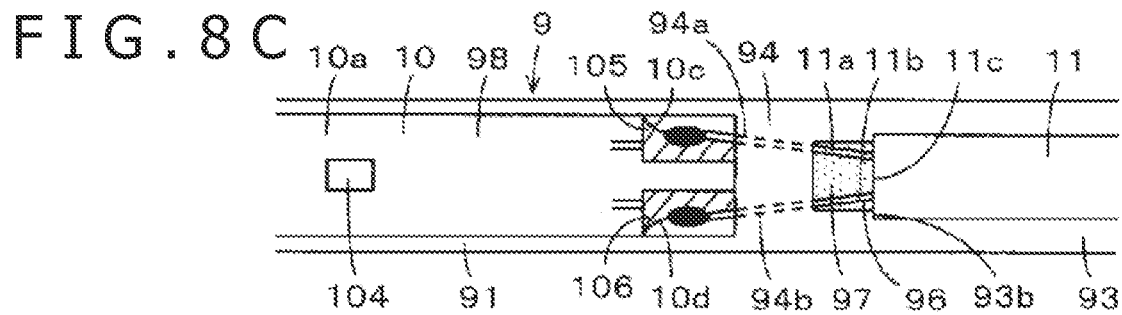

Next, as illustrated in FIG. 8C, in the state in which the positive and negative electrode conductors 11a and 11b of the battery 11 are respectively in contact with the tapered side surfaces 10c and 10d of the printed circuit board 10, the positive and negative electrode conductors 11a and 11b of the battery 11 are, in this example, respectively soldered to the conductor patterns 105 and 106 so as to be electrically connected thereto. The soldering is an example of a method for fixing the electrical connection, and the portions fixed by soldering are examples of electrical connection fixing portions.

Figure 8D:
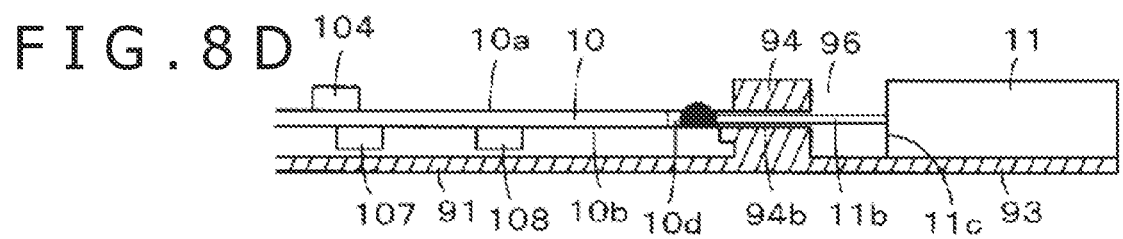

FIG. 8D is a side view of the state of FIG. 8C viewed from the side surface direction parallel to the upper surface 10a of the printed circuit board 10. For convenience of description, the board holder 9 is omitted in FIG. 8D. In FIGS. 8C and 8D, the portions fixed by soldering are filled in black.

Figure 8E:
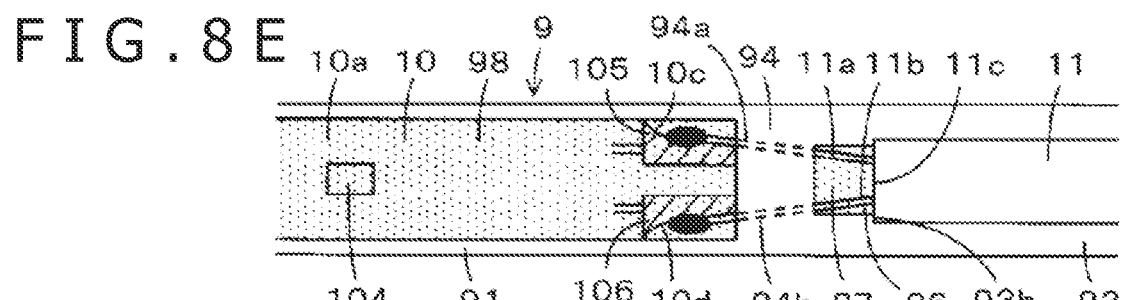

In the present embodiment, after the printed circuit board 10 and the battery 11 are electrically connected to each other as described above, the separation space 96 between the end surface 11c of the battery 11 in the battery housing portion 93 and the wall portion 94 is filled with a resin, which is then hardened and formed as a resin-filled portion 97 as illustrated in FIG. 8E. The upper surface 10a and the lower surface 10b of the printed circuit board 10 in the board housing portion 91 of the board holder 9 are also filled with a resin. In this way, a resin-filled portion 98 and a resin-filled portion 99 are formed so as to respectively cover the upper surface 10a and the lower surface 10b of the printed circuit board 10. In this example, an ultraviolet (UV)-curable resin is used as the resin.

Figure 8F:
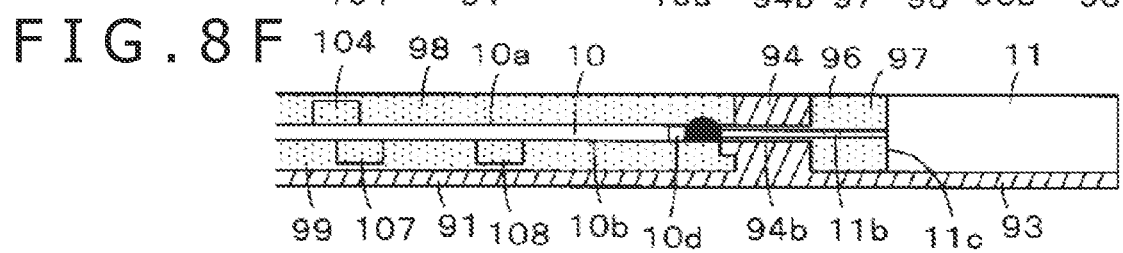

FIG. 8F is a side view of the state of FIG. 8E viewed from the side surface direction parallel to the upper surface 10a of the printed circuit board 10. For convenience of description, the board holder 9 is omitted in FIG. 8F. In FIGS. 8E and 8F, the resin-filled portion 98 and the resin-filled portion 99 are filled with dots.

An upper portion of the side switch 104 is entirely covered with the resin in FIGS. 8E and 8F. In actual implementation, however, the upper surface of the side switch 104, which performs switching by being depressed by the depression operator 22 of the side switch 104, is not covered with the resin but is exposed.

A pen module which is formed in this way and in which the pen tip side member is coupled to the fitting portion 92 of the board holder 9 holding the printed circuit board 10 and the battery 11 is housed in the hollow portion of the case 2 from the rear end of the case 2, and then, the rear end of the case 2 is closed by the rear-end cap 21. In this way, the electronic pen 1 is produced.

Figure 9:
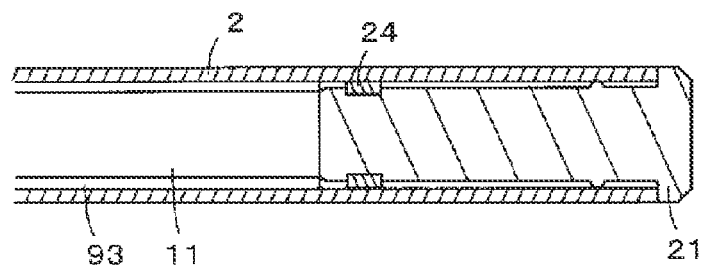
FIG. 9 is a view illustrating an example of a configuration on a rear end side of an electronic pen according to an embodiment of the present disclosure.

FIG. 9 is a sectional view illustrating a configuration on the rear end side of the case 2 into which the rear-end cap 21 is fitted. However, the battery 11 is not illustrated in the sectional view. As illustrated in FIG. 9, the rear-end cap 21 has a columnar shape corresponding to the shape of the hollow portion of the case 2. In the present embodiment, as illustrated in FIG. 9, ring-shaped sealing members 24 which are each made of an elastic material such as an elastic rubber are attached to a columnar-shaped portion of the rear-end cap 21. The sealing members 24 seal and eliminate the gap between the rear-end cap 21 and the inner wall surface of the hollow portion of the case 2.

Therefore, in the present embodiment, the presence of the sealing members 24 can prevent water and dust from entering through the opening on the rear end side of the case 2, providing the waterproof and dustproof protection. As described above, the opening on the pen tip side of the case 2 can be waterproofed and dustproofed by the front cap 4 and the sealing member 95 of the fitting portion 92 of the board holder 9. Even when an opening for the depression operator 22 of the side switch 104 is formed in the case 2, the upper surface 10a and the lower surface 10b of the printed circuit board 10 are respectively covered with the resin-filled portions 98 and 99, and the separation space 96 between the end surface 11c of the battery 11 and the wall portion 94 is covered with the resin-filled portion 97. Accordingly, these portions are configured so as to be waterproofed and dustproofed.

In the present embodiment, a force from the pen tip side is received not only in the axial direction of the positive and negative electrode conductors 11a and 11b of the battery 11 but also by the separation space 96. With this configuration, the battery 11 can obtain advantageous effects of shock resistance and reduction of stress on the positive and negative electrode conductors 11a and 11b.

In the present embodiment, the wall portion 94 is disposed between the board housing portion 91 and the battery housing portion 93 of the board holder 9. An axial force that is generated by the pen pressure or impact load applied to the core 3 is applied to the printed circuit board 10. The generated axial force is then received by the wall portion 94 against which a rear end portion of the printed circuit board 10 abuts. Accordingly, the axial force is not directly applied to the battery 11. Even if the axial force is applied to the battery 11, the applied force is absorbed and reduced by the separation space 96 between the end surface 11c of the battery 11 and the wall portion 94.

Moreover, since the positive and negative electrode conductors 11a and 11b extend in the direction inclined relative to the axial direction, the resistance to the axial force increases. That is, if the positive and negative electrode conductors 11a and 11b are led out in the direction perpendicular to the end surface 11c of the battery 11 and parallel to the axial direction, the positive and negative electrode conductors 11a and 11b receive the axial force as it is. On the other hand, if the positive and negative electrode conductors 11a and 11b extend in the direction inclined relative to the axial direction, the force received is smaller than that in the case where the entire axial force is received, because the force is divided into the axial force and the force in the direction perpendicular to the axial direction according to the inclination angle.

The tip portions of the positive and negative electrode conductors 11a and 11b of the battery 11 are respectively in contact with the tapered side surfaces 10c and 10d in the rear end portion of the printed circuit board 10. Moreover, the tip portions of the positive and negative electrode conductors 11a and 11b of the battery 11, which are respectively in contact with the tapered side surfaces 10c and 10d, are soldered and fixed thereto for electrical connection. Therefore, the tip portions of the positive and negative electrode conductors 11a and 11b are respectively engaged with the tapered side surfaces 10c and 10d. With this configuration, the battery 11 can obtain greater advantageous effects of shock resistance and reduction of stress on the positive and negative electrode conductors 11a and 11b.

Moreover, in the present embodiment, the separation space 96 including base portions of the positive and negative electrode conductors 11a and 11b between the end surface 11c of the battery 11 and the wall portion 94 is solidified by the resin-filled portion 97. This configuration increases the resistance of the battery 11 to the axial force. In addition, as described above, the resin-filled portion 97 exhibits effects of dustproofing and waterproofing the separation space 96 including the base portions of the positive and negative electrode conductors 11a and 11b of the battery 11.

Other Embodiments or Modifications

Figure 10A:
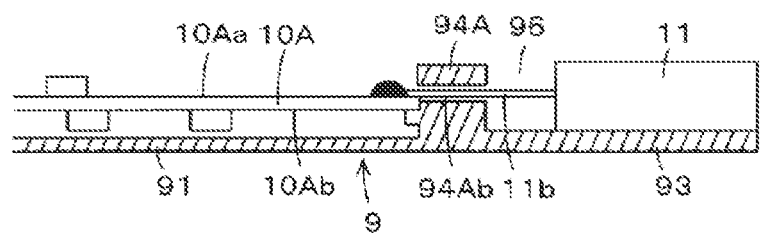
FIGS. 10A and 10B are views for describing an example of an electronic pen according to an embodiment of the present disclosure.
Figure 10B:
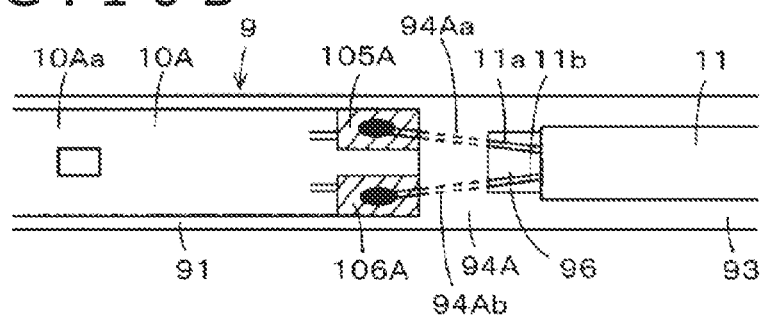

In the embodiment described above, the tip portions of the positive and negative electrode conductors 11a and 11b of the battery 11 are respectively in contact with the tapered side surfaces 10c and 10d in the rear end portion of the printed circuit board 10. However, as illustrated in FIGS. 10A and 10B, the tip portions of the positive and negative electrode conductors 11a and 11b of the battery 11 may be in contact with either an upper surface 10Aa or a lower surface 10Ab of a printed circuit board 10A and fixed thereto for electrical connection. In the example illustrated in FIGS. 10A and 10B, the tip portions of the positive and negative electrode conductors 11a and 11b of the battery 11 are in contact with the upper surface 10Aa and fixed thereto for electrical connection. Moreover, in this example, a rear end portion of the printed circuit board 10A has a rectangular shape without having tapered side surfaces, as illustrated in FIG. 10B.

FIG. 10A is a side view illustrating the vicinity of a portion where the printed circuit board 10A and the battery 11 are connected and fixed to each other, as in FIG. 8D. Note that the board holder 9 is omitted in FIG. 10A. FIG. 10B is a view illustrating the state of FIG. 10A viewed from the upper surface 10Aa side of the printed circuit board 10A, as in FIG. 8C.

As illustrated in FIGS. 10A and 10B, in this example, the positive and negative electrode conductors 11a and 11b of the battery 11 are respectively inserted through through-holes 94Aa and 94Ab of a wall portion 94A so as to extend toward the board housing portion 91 and to come into contact with the upper surface 10Aa of the printed circuit board 10A which is housed in the board housing portion 91. In this case, as illustrated in FIG. 10B, a conductor pattern 105A which constitutes one power supply terminal and a conductor pattern 106A which constitutes the other power supply terminal are formed on the upper surface 10Aa of the printed circuit board 10A at the positions in contact with the positive and negative electrode conductors 11a and 11b.

Then, as illustrated in FIGS. 10A and 10B, the positive and negative electrode conductors 11a and 11b of the battery 11, which are respectively in contact with the conductor patterns 105A and 106A of the printed circuit board 10A, are soldered (filled in black in FIGS. 10A and 10B) and fixed thereto for electrical connection.

After that, in a similar way to the one illustrated in FIGS. 8E and 8F, the separation space 96 between the wall portion 94 and the end surface 11c of the battery 11 is filled with a UV-curable resin, and the upper surface 10Aa and the lower surface 10Ab of the printed circuit board 10A are each covered with a resin.

With this example illustrated in FIGS. 10A and 10B, similar effects to those described above can be obtained.

Figure 11A:
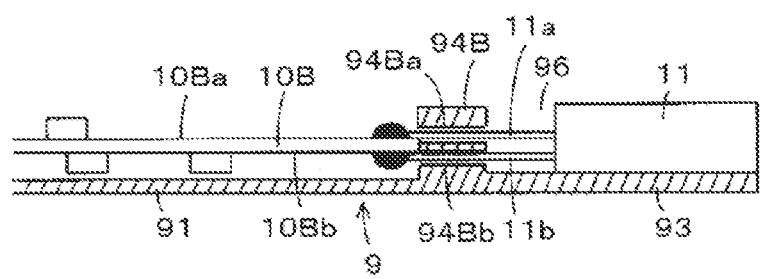
FIGS. 11A and 11B are views for describing an example of an electronic pen according to an embodiment of the present disclosure.
Figure 11B:
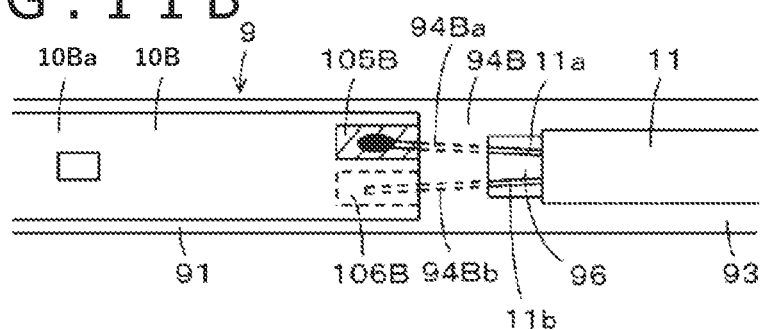

As illustrated in FIGS. 11A and 11B, one of the positive and negative electrode conductors 11a and 11b of the battery 11 may be in contact with an upper surface 10Ba of a printed circuit board 10B and fixed thereto for electrical connection, and the other electrode conductor may be in contact with a lower surface 10Bb of the printed circuit board 10B and fixed thereto for electrical connection. As illustrated in FIG. 11B, in this example, a rear end portion of the printed circuit board 10B has a rectangular shape without having tapered side surfaces. Further, a conductor pattern 105B which constitutes one power supply terminal is formed on the upper surface 10B a of the printed circuit board 10B, and a conductor pattern 106B which constitutes the other power supply terminal is formed on a different surface, that is, the lower surface 10Bb of the printed circuit board 10B.

FIG. 11A is a side view illustrating the vicinity of a portion where the printed circuit board 10B and the battery 11 are connected and fixed to each other, as in FIG. 8D. Note that the board holder 9 is omitted in FIG. 11A. FIG. 11B is a view illustrating the state of FIG. 11A viewed from the upper surface 10B a side of the printed circuit board 10B, as in FIG. 8C.

In this example as well, as illustrated in these FIGS. 11A and 11B, the positive and negative electrode conductors 11a and 11b of the battery 11 are respectively inserted through through-holes 94Ba and 94Bb of a wall portion 94B so as to extend toward the board housing portion 91. In this case, the through-holes 94Ba and 94Bb are not formed in the direction parallel to the upper surface 10Ba of the printed circuit board 10B, but are formed at slightly different positions in the height direction of the wall portion 94B as illustrated in FIG. 11A. Accordingly, in this example, the tip portion of the positive electrode conductor 11a is in contact with the upper surface 10Ba of the printed circuit board 10B which is housed in the board housing portion 91, while the tip portion of the negative electrode conductor 11b is in contact with the lower surface 10Bb of the printed circuit board 10B which is housed in the board housing portion 91.

In this case, as illustrated in FIG. 11B, the conductor pattern 105B, which constitutes one power supply terminal, is formed on the upper surface 10Ba of the printed circuit board 10B at the position in contact with the tip portion of the positive electrode conductor 11a, and the conductor pattern 106B, which constitutes the other power supply terminal, is formed on the lower surface 10Bb of the printed circuit board 10B at the position in contact with the tip portion of the negative electrode conductor 11b.

Then, as illustrated in FIGS. 11A and 11B, the positive and negative electrode conductors 11a and 11b of the battery 11, which are respectively in contact with the conductor patterns 105B and 106B of the printed circuit board 10B, are soldered (filled in black in FIGS. 11A and 11B) and fixed thereto for electrical connection.

After that, in a similar way to the one illustrated in FIGS. 8E and 8F, the separation space 96 between the wall portion 94 and the end surface 11c of the battery 11 is filled with a UV-curable resin, and the upper surface 10Ba and the lower surface 10Bb of the printed circuit board 10B are each covered with a resin.

With this example illustrated in FIGS. 11A and 11B, similar effects to those described above can be obtained.

In the embodiments described above, as penetration portions, the through-holes 94a and 94b are formed in the wall portion 94, and the through-holes 94Ba and 94Bb are formed in the wall portion 94B. However, the penetration portions formed in the wall portion are not limited to the through-holes, and may be through grooves illustrated in FIG. 12.

Figure 12:
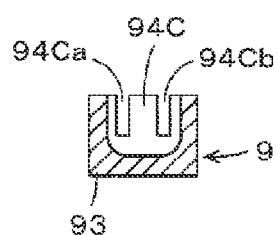
FIG. 12 is a view for describing an example of an electronic pen according to an embodiment of the present disclosure.

FIG. 12 illustrates a cross section of the battery housing portion 93 of the board holder 9. A wall portion 94C according to this example has through grooves 94Ca and 94Cb through which the positive and negative electrode conductors 11a and 11b of the battery 11 penetrate the wall portion 94C and extend toward the board housing portion 91. In this example, when the separation space 96 is filled with a resin or the upper surface 10a or 10B a of the printed circuit board 10 or 10B is covered with a resin, the resin also enters the through grooves 94Ca and 94Cb, covering the positive and negative electrode conductors 11a and 11b.

Other Embodiments

Although the electronic pen is of an electromagnetic induction type in the embodiment described above, the present disclosure can also be applied to the case where the electronic pen is of an active capacitive type. In other words, in the case where the electronic pen is of the active capacitive type, the pen tip side member includes a conductive core instead of the ferrite core around which the coil is wound, and an electronic circuit formed on the printed circuit board includes a signal generation circuit that generates a signal to be transmitted from the conductive core to a position detection sensor of the position detection device. The other configurations of the electronic pen of the active capacitive type are similar to the configurations of the electronic pen of the electromagnetic induction type.

The configuration of the electronic pen of the active capacitive type will be described with reference to FIG. 2. The printed circuit board 10 on which an electronic circuit for the electronic pen of the active capacitive type is mounted is housed in the board housing portion 91 of the board holder 9, and the battery 11 is housed in the battery housing portion 93 such that an electrical connection portion can be formed as described above. Moreover, the pen-pressure detection module 8 can be fitted into the fitting portion 92 of the board holder 9 in a similar way to the configuration of the electronic pen of the electromagnetic induction type.

Further, the core 3 may be of a conductive type. In addition, instead of the ferrite core around which the coil is wound, a shielding member such as a metal pipe which allows the core to penetrate therethrough and which capacitively shields the core may be fitted into the pen-pressure detection module. In this case, a tip portion of the shielding member may be covered with the front cap 4.

It should be understood by those skilled in the art that various modifications, combinations, sub-combinations and alterations may occur depending on design requirements and other factors insofar as they are within the scope of the appended claims or the equivalents thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen comprising:
   a tubular casing;
   a circuit board disposed in a hollow portion of the tubular casing such that an axial direction of the casing is aligned with a longitudinal direction of the circuit board;
   an electronic circuit disposed on the circuit board; and
   a battery that has a columnar shape and that is disposed on a side of the circuit board opposite to a pen tip side of the circuit board in the axial direction inside the hollow portion of the casing in a state in which positive and negative electrode conductors protruding from an end surface of the battery on one side in a centerline direction of the columnar shape extend toward the circuit board,
   wherein the battery is disposed in a state in which a separation space is formed between the end surface of the battery from which the positive and negative electrode conductors protrude and an end portion of the circuit board on one side in the longitudinal direction and in which tip portions of the positive and negative electrode conductors are in contact with the circuit board,
   wherein the positive and negative electrode conductors of the battery extend in a direction parallel to an upper surface of the circuit board and are disposed such that a distance between the positive and negative electrode conductors increases as the positive and negative electrode conductors are away from the end surface of the battery.

2. The electronic pen according to claim 1,
   wherein the positive and negative electrode conductors of the battery extend in the direction parallel to the upper surface of the circuit board and are disposed such that the distance between the positive and negative electrode conductors increases as the positive and negative electrode conductors are away from the end surface of the battery, and
   a width of the end portion of the circuit board in contact with the positive and negative electrode conductors of the battery gradually decreases such that side end surfaces of the circuit board that are located between the upper surface and a lower surface of the circuit board are in contact with the tip portions of the positive and negative electrode conductors of the battery.

3. The electronic pen according to claim 1, wherein the tip portions of the positive and negative electrode conductors of the battery are in contact with the circuit board on side end surfaces of the circuit board that are located between an upper surface and a lower surface of the circuit board.

4. The electronic pen according to claim 1, wherein a surface of the circuit board on which the electronic circuit is formed includes soldered portions in which the circuit board and the tip portions of the positive and negative electrode conductors of the battery are soldered to each other, and is covered with a resin.

5. The electronic pen according to claim 1, further comprising:
   a coil wound around a ferrite core and disposed on a pen tip side of the electronic pen; and
   a capacitor included in the electronic circuit and connected in parallel to the coil to constitute a resonant circuit,
   wherein the electronic pen is of an electromagnetic induction type.

6. The electronic pen according to claim 5, further comprising:
   a ring-shaped sealing member that is elastically in close contact with a pen tip side of the ferrite core and an inner wall surface of the casing.

7. The electronic pen according to claim 1, further comprising:
   a conductive core disposed on a pen tip side of the electronic pen; and
   a signal generation circuit included in the electronic circuit,
   wherein the signal generation circuit, in operation, generates a signal that is transmitted through the core, and
   wherein the electronic pen is of a capacitive type.

8. The electronic pen according to claim 1, wherein the battery is a lithium-ion battery.

9. The electronic pen according to claim 1, wherein at least a base side of the positive and negative electrode conductors within the separation space is covered with a resin.

10. The electronic pen according to claim 9, wherein the resin is an ultraviolet-curable resin.

11. An electronic pen comprising:
    a tubular casing;
    a circuit board disposed in a hollow portion of the tubular casing such that an axial direction of the casing is aligned with a longitudinal direction of the circuit board;
    an electronic circuit disposed on the circuit board; and
    a battery that has a columnar shape and that is disposed on a side of the circuit board opposite to a pen tip side of the circuit board in the axial direction inside the hollow portion of the casing in a state in which positive and negative electrode conductors protruding from an end surface of the battery on one side in a centerline direction of the columnar shape extend toward the circuit board,
    wherein the battery is disposed in a state in which a separation space is formed between the end surface of the battery from which the positive and negative electrode conductors protrude and an end portion of the circuit board on one side in the longitudinal direction and in which tip portions of the positive and negative electrode conductors are in contact with the circuit board,
    wherein the positive and negative electrode conductors of the battery extend toward the circuit board through groove portions formed in a wall portion of the casing disposed in a substantially middle of the casing in the axial direction within the separation space.

12. The electronic pen according to claim 11, further comprising:
    a holder having a boat-like shape and including the wall portion,
    wherein the circuit board and the battery are housed side by side in the axial direction in the holder in a state in which the circuit board and the battery are separated from each other by the wall portion.

13. The electronic pen according to claim 12,
wherein a fitting portion in which a pen tip side member is fitted is formed on a pen tip side of the holder and configured as a tubular portion, and
a ring-shaped sealing member that is elastically in close contact with an inner wall surface of the casing is attached to an outer circumferential surface of the tubular portion.

14. The electronic pen according to claim 13, wherein a rear end member including the ring-shaped sealing member that is elastically in close contact with the inner wall surface of the casing is disposed on the casing on a side opposite to a side of the battery facing the circuit board.

15. The electronic pen according to claim 11, wherein, within the separation space, at least a space between the wall portion and the end surface of the battery from which the positive and negative electrode conductors protrude, is filled with a resin.

16. The electronic pen according to claim 15, wherein a surface of the circuit board that is positioned closer to the pen tip side than the wall portion is to the pen tip side and that has the electronic circuit formed thereon includes soldered portions in which the circuit board and the tip portions of the positive and negative electrode conductors of the battery are soldered to each other, and is covered with the resin.

* * * * *